United States Patent [19]
Aziz et al.

[11] 4,020,128
[45] Apr. 26, 1977

[54] POLYMERIZATES OF OLEFINIC NITRILES AND DIENE RUBBERS

[75] Inventors: Walid Y. Aziz, Warrensville; Lawrence E. Ball, Cuyahoga Falls; George S. Li, Aurora, all of Ohio

[73] Assignee: Standard Oil Company, Cleveland, Ohio

[22] Filed: Feb. 13, 1976

[21] Appl. No.: 657,867

[52] U.S. Cl. .............................. 260/879; 260/880 R
[51] Int. Cl.² ........................................ C08F 279/02
[58] Field of Search ........................ 260/879, 880 R

[56] References Cited
UNITED STATES PATENTS

| 3,947,527 | 3/1976 | Li et al. ............................. 260/879 |
| 3,950,454 | 4/1976 | Hensley et al. .................... 260/879 |

*Primary Examiner*—William F. Hamrock
*Attorney, Agent, or Firm*—John F. Jones; Sherman J. Kemmer

[57] ABSTRACT

Polymeric compositions having good impact resistance, low permeability to gases, and high-softening temperatures which are composed of a conjugated diene monomer, such as butadiene, an olefinically unsaturated nitrile, such as acrylonitrile, an alpha-olefin, such as isobutylene, and indene are described.

10 Claims, No Drawings

POLYMERIZATES OF OLEFINIC NITRILES AND DIENE RUBBERS

The present invention relates to novel polymeric compositions which have good impact resistance, low permeability to gases, and high-softening temperatures, and more particularly pertains to high-softening, impact-resistant compositions of low creep characteristics which function as gas and vapor barrier materials and are composed of the essential components of a conjugated diene monomer, an olefinically unsaturated nitrile, an alpha-olefin, and indene, and to a process for preparing them.

The novel polymeric products of the present invention are prepared by polymerizing a major proportion of an olefinically unsaturated nitrile, such as acrylonitrile, and a minor proportion of an alpha-olefin, such as isobutylene, and indene, in the presence of a preformed rubbery polymer composed of a conjugated diene monomer, such as butadiene.

The conjugated diene monomers useful in the present invention include butadiene-1,3, isoprene, chloroprene, bromoprene, cyanoprene, 2,3-dimethyl-butadiene-1,3, and the like. Most preferred for the purpose of this invention are butadiene and isoprene because of their ready availability and their excellent copolymerization properties.

The olefinically unsaturated nitriles useful in this invention are the alpha, beta-olefinically unsaturated mononitriles having the structure

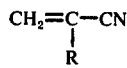

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitrile in the present invention is acrylonitrile.

The alpha-olefins useful in the present invention are those having at least 4 and as many as 10 carbon atoms having the structure

wherein R' and R" are alkyl groups having from 1 to 7 carbon atoms, and more specifically isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

Indene (1-H-indene) and coumarone (2,3-benzofuran) and mixtures are useful as monomers in the present invention. Most preferred is indene.

The polymeric compositions of the present invention can be prepared by any of the known general techniques of polymerization, including the bulk polymerization, solution polymerization, and emulsion or suspension polymerization techniques by batch, continuous or intermittent addition of the monomers and other components. The preferred method is emulsion polymerization. The polymerization is preferably carried out in an aqueous medium in the presence of an emulsifier and a free radical generating polymerization initiator at a temperature of from about 0° to 100° C in the substantial absence of oxygen.

The rubbery polymers in the present invention are homopolymers of the conjugated diene monomers mentioned above as well as copolymers of these dienes and other monomers such as acrylonitrile, styrene, and ethyl acrylate, wherein there is present at least 50% by weight of the total monomers of the conjugated diene monomer.

The preferred polymeric compositions embodied herein are those resulting from the polymerization of 100 parts by weight of (A) about 60 to 90% by weight of at least one nitrile having the structure

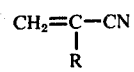

wherein R has the foregoing designation, (B) from 10 to 30% by weight of an alpha-olefin having the structure

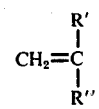

wherein R' and R" have the foregoing respective designations, and (C) from 1 to 20% by weight of at least one member selected from the group consisting of indene and coumarone wherein the given percentages of (A), (B) and (C) are based on the combined weight of (A), (B) and (C), in the presence of from 1 to 40 parts by weight of (D) a rubbery polymer of at least 50% by weight of a conjugated diene monomer selected from the group consisting of butadiene and isoprene and up to 50% by weight of at least one member selected from the group consisting of styrene, acrylonitrile, and ethyl acrylate.

More specifically, the present invention can be illustrated in the polymerization of a mixture of acrylonitrile, isobutylene, and indene in the presence of a preformed copolymer of butadiene-1,3 and acrylonitrile to produce a product having excellent impact strength, exceptionally good impermeability to gases and vapors, and improved ASTM heat-distortion temperature.

Preferably, the acrylonitrile-isobutylene-indene monomer component should contain 70 to 90% by weight of acrylonitrile, 10 to 30% by weight of isobutylene and 1 to 10% by weight of indene.

The preferred rubbery copolymer of butadiene-1,3 contains more than 50% by weight of combined butadiene based on the total weight of combined butadiene and other monomer. More preferably, the rubbery copolymer of butadiene and acrylonitrile should contain from 60 to 80% by weight of polymerized butadiene and 20 to 40% by weight of polymerized acrylonitrile.

In the foregoing polymerization, it is preferred that from about 1 to 40, and more preferably 1 to 20, parts by weight of the rubbery diene polymer be employed for each 100 parts by weight of combined acrylonitrile-isobutylene and indene. It has generally been found that as the relative amount of the rubbery diene polymer is increased in the final polymeric product, the impact strength increases and the gas and vapor barrier properties decrease somewhat. Thus, it is generally preferred to use just enough of the rubbery diene polymer to impart the desired impact strength to the polymeric product and to retain the optimum gas and vapor barrier properties in the polymeric product.

The novel polymeric products of the present invention are readily processed thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent solvent resistance, and their impact resistance (notched Izod above 0.5 foot pound per inch of notch) and low permeability to gases and vapors make them useful in the packaging industry, and they are particularly useful in the manufacture of bottles, film, and other types of containers for liquids and solids.

In the following illustrative examples, the amounts of ingredients are expressed in parts by weight unless otherwise indicated.

EXAMPLE 1

A. A nitrile rubber latex was prepared using the following ingredients and procedure:

| Ingredient | Parts |
| --- | --- |
| butadiene | 75 |
| acrylonitrile | 25 |
| soap flakes | 1.4 |
| water | 200 |
| Daxad 11* | 0.1 |
| Versene Fe-3** | 0.05 |
| t-dodecyl mercaptan | 0.65 |
| azobisisobutyronitrile | 0.4 |

*Sodium polyalkyl naphthalene sulfonate sold by Dewey and Almy Chemical Company.
**Sodium salt of diethanol glycine sold by Dow Chemical Company.

The batch emulsion polymerization was carried out at 50° C to 91% conversion.

B. A polymer was prepared from the following ingredients:

| Ingredient | Parts |
| --- | --- |
| acrylonitrile | 70 |
| isobutylene | 20 |
| indene | 10 |
| rubber latex (A of this example) on solids basis | 15 |
| water | 250 |
| potassium persulfate | 0.3 |
| Gafac RE-610* | 3 |
| t-dodecyl mercaptan | 0.0375 |

*A mixture of R—O—(CH$_2$CH$_2$O—)$_n$PO$_3$M$_2$ and [R—O—(CH$_2$CH$_2$O—)$_n$]$_2$PO$_2$M wherein n is a number from 1 to 40, R is an alkyl or alkaryl group and preferably a nonyl phenyl group, and M is hydrogen, ammonia or an alkali metal, which composition is sold by GAF Corporation.

The above mixture was adjusted to pH 6.8 and the polymerization reaction was carried out at 60° in the substantial absence of molecular oxygen. After a reaction time of about 20 hours, the resin was isolated from the latex by coagulation with a hot solution of alum in water. The coagulated resin was washed with methanol and vacuum dried at 40° C for 48 hours. Test bars and sheets were molded from the dried resin and were found to have the following properties:

| | |
| --- | --- |
| heat-distortion temperature (ASTM D-64A, 264 psi) | 79° C |
| flexural strength (ASTM D-790) | 6.55 × 10$^3$ psi |
| flexural modulus (ASTM D-790) | 2.11 × 10$^5$ psi |
| tensile strength (ASTM D-638) | 5.01 × 10$^3$ psi |
| notched Izod impact strength (ASTM D-256) | 7.3 foot pounds per inch of notch |

The dry resin had a Brabender plasticorder torque of 1800 meter grams at 235° C after about 15 minutes. A film of this resin was found to have a water vapor transmission rate of 3.5 grams-mil/100 inches$^2$/24 hours/atmosphere at 90% relative humidity, 3.9 at 100% relative humidity, and an oxygen transmission rate of 2.0 cc-mil/100 inches$^2$/24 hours/atmosphere.

EXAMPLE 2

The procedure of Example 1A and 1B was repeated except that 10 parts of the rubber were used instead of the 15 parts used in Example 1B. The resulting resin was found to have the following properties:

| | |
| --- | --- |
| heat-distortion temperature (ASTM D-64A, 264 psi) | 81° C |
| flexural strength (ASTM D-790) | 12.3 × 10$^3$ psi |
| flexural modulus (ASTM D-790) | 3.63 × 10$^5$ psi |
| tensile strength (ASTM D-638) | 8.62 × 10$^3$ psi |
| notched Izod impact strength (ASTM D-256) | 0.8 foot pound per inch of notch |

A film of the resin was found to have a water vapor transmission rate of 3.9 grams-mil/100 inches$^2$/24 hours/atmosphere at 90% relative humidity, 4.3 at 100% relative humidity, and an oxygen transmission rate of 1.83 cc-mil/100 inches$^2$/24 hours atmosphere.

EXAMPLE 3

A polymer was prepared from the following ingredients:

| Ingredient | Parts |
| --- | --- |
| acrylonitrile | 70 |
| isobutylene | 25 |
| indene | 5 |
| rubber latex A of Example 1 (solids basis) | 15 |
| water | 250 |
| potassium persulfate | 0.3 |
| Gafac RE-610 | 3 |
| t-dodecyl mercaptan | 0.0375 |

The polymerization was carried out and the resin was recovered as described in Example 1B. The resulting resin was found to have the following properties:

| | |
| --- | --- |
| heat-distortion temperature (ASTM D-64A, 264 psi) | 73° C |
| flexural strength (ASTM D-790) | 6.75 × 10$^3$ psi |
| flexural modulus (ASTM D-790) | 2.2 × 10$^5$ psi |
| tensile strength (ASTM D-638) | 5.33 × 10$^3$ psi |
| notched Izod impact strength (ASTM D-256) | 5.9 foot pounds per inch of notch |

EXAMPLE 4

A polymer was prepared from the following ingredients:

| Ingredient | Parts |
| --- | --- |
| acrylonitrile | 70 |
| isobutylene | 10 |
| indene | 20 |
| rubber latex A of Example 1 (solids basis) | 15 |
| water | 250 |
| potassium persulfate | 0.3 |
| Gafac RE-610 | 3 |
| t-dodecyl mercaptan | 0.0375 |

The polymerization was carried out and the resulting resin was recovered as described in Example 1B. The resin was found to have the following properties:

| | |
| --- | --- |
| heat-distortion temperature (ASTM D-64A, 264 psi) | 98° C |
| flexural strength (ASTM D-790) | 8.45 × 10³ psi |
| flexural modulus (ASTM D-790) | 2.63 × 10⁵ psi |
| tensile strength (ASTM D-638) | 5.91 × 10³ psi |
| notched Izod impact strength (ASTM D-256) | 6.4 foot pounds per inch of notch |

EXAMPLE 5

A polymer was prepared from the following ingredients:

| Ingredient | Parts |
| --- | --- |
| acrylonitrile | 70 |
| isobutylene | 15 |
| indene | 15 |
| rubber latex A of Example 1 (solids basis) | 15 |
| water | 250 |
| potassium persulfate | 0.3 |
| Gafac RE-610 | 3 |
| t-dodecyl mercaptan | 0.0375 |

The polymerization was carried out and the resulting resin was recovered as described in Example 1B. The resin was found to have the following properties:

| | |
| --- | --- |
| heat-distortion temperature (ASTM D-64A, 264 psi) | 88° C |
| flexural strength (ASTM D-790) | 11.8 × 10³ psi |
| flexural modulus (ASTM D-790) | 3.7 × 10⁵ psi |
| tensile strength (ASTM D-638) | 8.62 × 10³ psi |
| notched Izod impact strength (ASTM D-256) | 1.2 foot pounds per inch of notch |

*(continued)*

| | |
| --- | --- |
| oxygen transmission rate | 5.0 cc-mil/100 inches²/24 hours/atmosphere |

EXAMPLE 6

A polymer which is outside the scope of the present invention was prepared by the copolymerization of acrylonitrile and isobutylene in the presence of a rubber latex using the following ingredients:

| Ingredient | Parts |
| --- | --- |
| acrylonitrile | 80 |
| isobutylene | 20 |
| rubber latex A of Example 1 (solids basis) | 15 |
| water | 250 |
| potassium persulfate | 0.3 |
| Gafac RE-610 | 3 |
| t-dodecyl mercaptan | 0.0375 |

The polymerization and work-up procedures of Example 1B were followed. The resulting resin was found to have the following properties:

| | |
| --- | --- |
| heat-distortion temperature (ASTM D-64A, 264 psi) | 68° C |
| flexural strength (ASTM D-790) | 8.55 × 10³ psi |
| flexural modulus (ASTM D-790) | 2.63 × 10⁵ psi |
| notched Izod impact strength (ASTM D-256) | 15.1 foot pounds per inch of notch |

A film of this resin was found to have a water vapor transmission rate of 4.6 grams-mil/100 inches²/24 hours/atmsophere at 90% relative humidity and 5.1 at 100% relative humidity.

EXAMPLE 7

Another polymer which is outside the scope of this invention was prepared by the copolymerization of acrylonitrile, isobutylene and indene without any rubber latex using the following ingredients:

| Ingredient | Parts |
| --- | --- |
| acrylonitrile | 70 |
| isobutylene | 20 |
| indene | 10 |
| water | 250 |
| potassium persulfate | 0.3 |
| Gafac RE-610 | 3 |
| t-dodecyl mercaptan | 0.0375 |

The polymerization and resin work-up procedures of Example 1B were repeated yielding a resin having the following properties:

| | |
| --- | --- |
| heat-distortion temperature (ASTM D-64A, 264 psi) | 83° C |
| flexural strength (ASTM D-790) | 19 × 10³ psi |
| flexural modulus (ASTM D-790) | 5.1 × 10⁵ psi |
| tensile strength (ASTM D-638) | 12.5 × 10³ psi |
| notched Izod impact strength (ASTM D-256) | 0.3 foot pound per inch of notch |

We claim:

1. The polymeric composition resulting from the polymerization of 100 parts by weight of A. from about 60 to 90% by weight of at least one nitrile having the structure

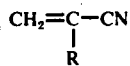

wherein R is hydrogen, a lower alkyl group having from 1 to 4 carbon atoms, or a halogen, B. from 10 to 30% by weight of an alpha-olefin having the structure

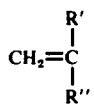

wherein R' and R'' are alkyl groups having from 1 to 7 carbon atoms, and

C. from 1 to 20% by weight of at least one member selected from the group consisting of indene and coumarone wherein the given percentages of (A), (B) and (C) are based on the combined weight of (A), (B) and (C) in the presence of from 1 to 40 parts by weight of D. a rubbery polymer of at least 50% by weight of a conjugated diene monomer selected from the group consisting of butadiene and isoprene and up to 50% by weight of at least one member selected from the group consisting of styrene, acrylonitrile, and ethyl acrylate.

2. The composition of claim 1 wherein the nitrile is acrylonitrile.

3. The composition of claim 2 wherein the alpha-olefin is isobutylene.

4. The composition of claim 3 wherein (C) is indene.

5. The composition of claim 4 wherein (D) is a copolymer of butadiene and acrylonitrile.

6. The process comprising polymerizing in an aqueous emulsion in the presence of a free radical initiator and in the substantial absence of molecular oxygen 100 parts by weight of A. from about 60 to 90% by weight of at least one nitrile having the structure

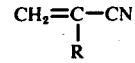

wherein R is hydrogen, a lower alkyl group having from 1 to 4 carbon atoms, or a halogen, B. from 10 to 30% by weight of an alpha-olefin having the structure

wherein R' and R'' are alkyl groups having from 1 to 7 carbon atoms, and

C. from 1 to 20% by weight of at least one member selected from the group consisting of indene and coumarone wherein the given percentages of (A), (B) and (C) are based on the combined weight of (A), (B) and (C) in the presence of from 1 to 40 parts by weight of D. a rubbery polymer of at least 50% by weight of a conjugated diene monomer selected from the group consisting of butadiene and isoprene and up to 50% by weight of at least one member selected from the group consisting of styrene, acrylonitrile, and ethyl acrylate, and recovering the polymeric resin product.

7. The process of claim 6 wherein the nitrile is acrylonitrile.

8. The process of claim 7 wherein the alpha-olefin is isobutylene.

9. The process of claim 8 wherein (C) is indene.

10. The process of claim 9 wherein (D) is a copolymer of butadiene and acrylonitrile.

* * * * *